Figure 1:
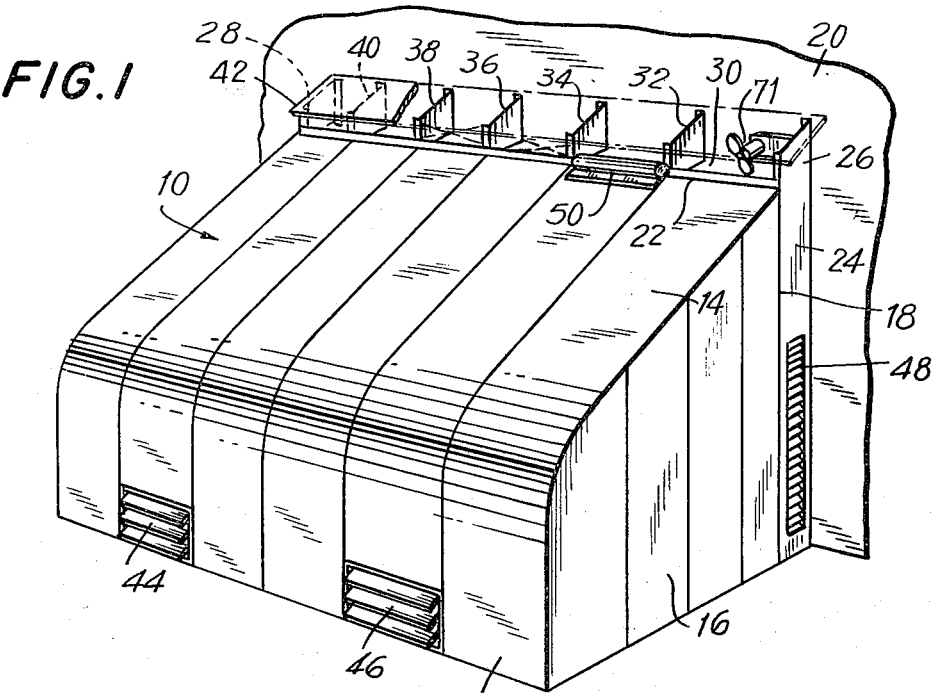

GREENHOUSE AND SOLARIUM STRUCTURERS AND RELATED METHOD

FIELD OF THE INVENTION

This invention relates to greenhouse and solarium constructions and improvements therefor whereby selective venting of the greenhouse and solarium enclosures may be effected. The invention also relates to methods for mounting greenhouse and solarium constructions against supporting structures with provision for venting.

BACKGROUND

Many different types of greenhouse and solarium constructions are known which involve glazing structures having glass or similar material supported in aluminum or other such types of frames for purposes of forming an enclosure wherein may be accommodated animal or botanical life. Thus, for example, greenhouses are known in which botanical life is accommodated in an enclosure which the sun's rays are permitted to enter while the botanical life is nevertheless sheltered from hostile environmental elements such as snow, rain, sleet, cold and so forth. Similarly, solarium constructions adapted for protecting human occupants, while exposing the same to the sun's rays, are also known.

Somewhat different from the conventional types of greenhouses where no thought is given to energy conservation and distribution are the newer types of solar greenhouses designed to conserve energy and to use the energy to heat the greenhouse itself or to provide various other advantages, such as heating of an associated home, providing hot water and so forth. In these greenhouses, plants thrive under the conditions of control of air circulation and energy conservation. Such greenhouses can often be considered to be substantially part of the home or dwelling constituting the supporting structure against which the greenhouse is mounted in lean-to posture.

In known greenhouse and solarium constructions ventilation of the greenhouse or solarium enclosure is generally provided by employing conventional roof sash venting or venting by means of glazing sections which are permitted to open in the manner of a hinged flap. This arrangement has the disadvantage that rain, snow, sleet and so forth may readily enter the enclosure while, at the same time, no controlled venting of the solarium or greenhouse enclosure is provided.

SUMMARY OF INVENTION

It is an object of the invention to provide improved means for providing venting of a greenhouse or solarium construction.

As will be shown, a primary improvement over conventional roof sash type of venting is that a superior weather-proof type continuous roof vent is provided.

Another provision of the invention is the incorporation of means for summer shading and winter heat retention without interfering in any manner with the venting afforded by the other provisions of the invention.

It is another object of the invention to provide superior ventilation and aesthetic eye-appeal for a greenhouse or solarium construction and particularly for such greenhouse and solarium constructions as may also be used as a living-in glass-enclosed room or a solar greenhouse for solar heat collection.

It is a further object of the invention to provide an improved venting system which can be added onto any lean-to type greenhouse or solarium construction between such construction and the house-wall which the construction leans against.

Still another object of the invention is to provide an improved venting system of the above-noted type which can be used in conventional self-contained greenhouses.

A basic consideration of the invention is that a greenhouse or solarium construction can be provided with a much cleaner looking profile without any roof sash venting incorporated into the same.

Still another object of the invention is to provide an improved method whereby conventional greenhouse and solarium constructions can be adapted to improved venting without any significant change in construction of the basic greenhouse or solarium parts.

In achieving the above and other objects of the invention, there is provided a greenhouse or solarium construction comprising glazing means defining a space adapted for accommodating botanical or animal life, said glazing means having an open side, construction means adapted at least partly to obturate an open side, spacing means between said glazing means and structure means for substantially obturating said open side except for an opening defined at an upper region of the glazing means between the glazing means and the structure means, and exhaust means to displace air from said space via the opening between the glazing means and said structure means.

In accordance with one embodiment of the invention, the aforesaid structure means may be the vertical wall of a dwelling or other such building. According to another embodiment of the invention, the supporting structure or structure means may be a second glazing means which may preferably have a shape which is a mirror reflection of the first said glazing means.

According to a feature of the invention, a shed means is provided which is spaced above the aforesaid opening in partially overlapping relation with the first said glazing means to define a generally lateral continuation of the aforesaid opening. The shed means is adapted to protect the opening from the penetration of hostile environmental elements such as rain.

In a specific version of the aforesaid spacing means, there may be provided a plurality of channels coupled to and extending between the structure means and glazing means. These channels may, in a preferred embodiment, be spaced and parallel C-channels.

More particularly, the glazing means may include a horizontal top edge portion and vertical end edge portions and first and second of the aforesaid channels will extend along the end edge portions between the latter and said structure means, whereas the remainder of the aforesaid channels, which will be substantially shorter than the first and second channels, extend between and space the top edge portion and said structure means.

In accordance with one embodiment of the invention, insulation may be provided in the first and second channels, which extend along the end edge portions between the end edge portions and the supporting structure means. According to still another feature of the invention, the first and second channels or one of these channels may be provided with air intake vents.

In a preferred embodiment of the invention, some of the channels, if not all, extend upwardly relative to the aforesaid top edge portion and include sloped upper end nent wood base for those greenhouses and solariums needing the same.

Alternative to the above, block walls may be employed which may have a height above grade of from 0" to 24" and greater. The higher the block wall, the higher the head room inside of the glazing construction.

As another alternative, a cement slab may be employed upon which to support a freestanding or lean-to type greenhouse or solarium. Preferably the slab will be pitched to permit water to be drained off. These problems and suggestions are, however, known from the previous art which will be improved in accordance with the embodiments of the invention to be described hereinbelow.

With reference to FIG. 1, there is shown therein a greenhouse or solarium construction consisting of a glazing structure 10. The specific details of the glazing structure are not shown since the support of glass or substitutes for glass in edge channels and the various arrangements of such glazing structures are well-known in the prior art.

In the illustrated glazing structure, there is a front portion 12, a sloped top portion 14 and two end portions 16. Each end portion 16 has a vertical end edge portion 18, whereas the top 14 has a horizontal top edge portion 22. The glazing structure is spaced from a supporting structure 20 in accordance with the invention to provide the benefits mentioned hereinabove and described in greater detail hereinafter. The supporting structure 20 may be constituted by the side wall of a dwelling or other such building or may be constituted by another glazing construction as described in greater detail hereinafter.

The purpose of supplying the spaced relationship between the glazing structure and supporting structure is to permit controlled ventilation in a manner which avoids the difficulties of the prior art constructions. This ventilation does not, however, require a spacing which is open to ambient atmosphere at the vertical end edge portions 18. These spacings are, therefore, obturated by two channels 24 which extend along the entire length of the end edge portions 18 and, in fact, extend above the glazing structure as indicated at 26. The opposite end channel has its upper end portion indicated at 28.

The horizontal top edge portion 22 of glazing structure 10 is spaced from supporting structure 20 to define an opening 30. Along the length of the opening 30 are spaced a plurality of further channels indicated at 32, 34, 36, 38 and 40. The number of these channels is substantially arbitrary except that it is preferred that these channels be spaced in equi-distant relationship along the entire length of the opening. These channels, as will be shown, are connected to the top edge portion 22 of the glazing structure on the one hand, and, on the other hand, are connected such as by nailing to the supporting structure 20. This provides for a strong and rigorous supporting of the top edge portion 22 while maintaining the same in fixed and spaced relationship relative to the supporting structure.

As a feature of the invention, as will be described in greater detail hereinafter, there is provided a shed 42. This shed which may be fabricated of aluminum, steel, wood, plastic or the like extends in partially overlapping relationship with the glazing structure 10 at the top edge portion 22. The function of the shed is to protect the opening 30 from the penetration of hostile environmental elements such as rain, sleet, snow and the like. It will be noted that this function of providing a venting opening while protecting the same against the penetration of hostile elements is accomplished without interfering with the function of venting the interior of the glazing structure 10, while at the same time there is little or no possibility of penetration of these hostile elements as is possible with the roofsash type venting of the prior art.

In the glazing structure 10, there may be provided conventional doors or other such openings as may be desired. These are not illustrated and if incorporated in the structure of the invention will be so incorporated in conventional form. The front 12 of the glazing structure 10 may, however, be provided with vents 44 and 46 which enable an intake of air from ambient atmosphere as desired. Vents 44 and 46 will preferably be selectively openable and closeable so as to operate according to the weather conditions which obtain during various periods of their use.

Additional air intake vents may be provided in the channels 24 and 28. One of these air intake vents is indicated by way of example at 48. The vent 48 may also be openable and closeable or may be fixed open vents as desired.

According to a further feature of the invention, a roll down cover means is provided such as indicated by way of example at 50. This roll down cover may be a single cover extending across the entire width of the glazing structure and being furthermore provided with a rope, chain or the like enabling the cover to be pulled down by an operator standing on the ground adjacent the front 12 of the glazing structure. The roll down cover means may also consist of a plurality of separately rolled strips, each fitting in a bay as defined for example between adjacent channels 32 and 34. The roll down covers are supported for unrolling and rolling up rotation by means (not shown) which are conventional. Such means may be mounted on the top edge portion 22 of the glazing structure 10 or may be mounted on adjacent channels 32 and 34 or in other such suitable arrangement as will be dictated by the width of the strips constituting the roll down covers.

It will be noted that the top edges of the channels 32, 34, 36, 38 and 40, as well as 24 and 28, are sloped as will be described in greater detail hereinafter. The purpose for this is to permit the support of a sloping shed 42, which will be mounted on and affixed to one or more of these channels.

Figure 2:
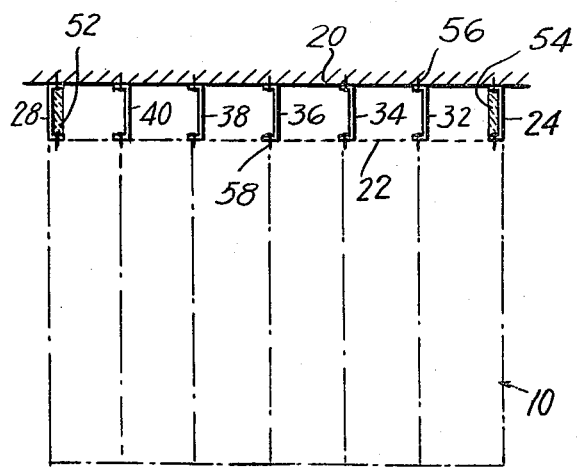

FIG. 2 illustrates the arrangement of channels described hereinabove. Therein it will be seen that channels 24, 32, 34, 36, 38, 40 and 28 are mounted in spaced parallel relationship. It will be noted that channels 24 and 28, as well as the remaining channels, are C-channels, or in other words, channels of C-shaped profile. Channels 24 and 28 open towards each other. The reason for this is to provide for an accommodation of insulation such as indicated at 52 and 54. This insulation may, for example, be constituted of fiber glass or foam or the like. Since the channels are preferably of a metal, the insulation 52 and 54 will serve to prevent the channels from directly supplying heat to or removing heat from the enclosure defined by the glazing structure.

Each of the channels is fastened to the supporting structure by a screw or a nail such as indicated at 56. The other flange of each of the channels is connected to the top edge portion 22 of the glazing structure 10 as diagrammatically indicated by bolts 58. Effectively, these bolts are connected to the greenhouse or solarium ridge or glazing bar (not shown).

Figure 3:
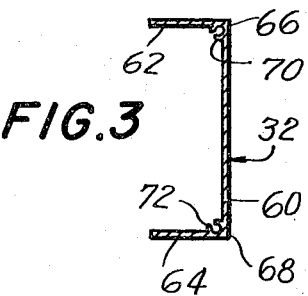

FIG. 3 illustrates in diagrammatic cross-section a channel or channel brace such as the brace 32. Therein it is seen that the channel includes the main web 60 to which are connected flanges 62 and 64 in integral monolithic relationship. At the corners 66 and 68 of the channels are incorporated means 70 and 72 defining screw holes which accommodate screws or bolts facilitating a connecting of a roof deck or shed at the upper ends of the channels whereby is constituted a shed support. As will be shown, such screw holes also admit of the connection of flap and screen assemblies for purposes to be described hereinafter.

Figure 4:
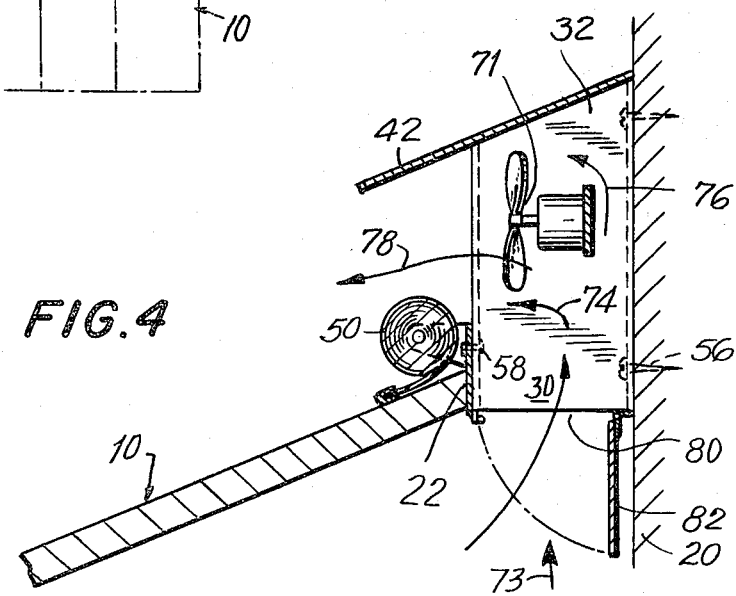

FIG. 4 illustrates in partially diagrammatic view the assembly consisting of the glazing structure 10 spaced from the supporting structure 20 to define an opening 30. Superposed above the opening 30 is the shed 42 mounted on the channels (e.g. 32) as described hereinabove. Mounted in one or more of the bays between the channels will be fans such as indicated at 71. These fans may be of conventional construction and are controlled by switches, not shown, operated from the interior of the greenhouse or solarium construction. Air flow is indicated by arrows 73, 74, 76 and 78. The roll down cover is indicated at 50.

In further accordance with the invention, there may be mounted across the throat of the opening 30 a screen 80. This screen may be of conventional construction and fabricated, for example, with aluminum framing or the like. This framing will be screwed to the bottom of the channels by means of the screw hole providing means 70 and 72 referred to hereinabove.

As a further feature of the invention there is provided a metallic or plastic flap indicated at 82. This flap is used to obturate the throat of the opening 30 on the interior of the same. This flap may be conventionally hinged by hinges supported by the means providing screw opening 70 and/or 72. The flap may be spring-loaded or not and may be manually operated or otherwise. The flap will have an open position as indicated at 82 or will have a closed position abutting in face-to-face relationship with the screen as illustrated at 80.

FIG. 4 illustrates, moreover, the fastening devices or nails 56 referred to hereinabove. This figure also illustrates the use of the bolts or other such fastening devices 58 which were also referred to above with reference to FIG. 2.

The shed 42 is shown as extending in overlapping relationship with the top edge portion 22 of the glazing structure 10. This overlap may be, for example, an overlap of six inches or greater and may, for example, involve an overlap of up to two feet or more. The purpose of this overlap is to prevent the penetration of rain or the like into the opening 30, despite the angle of inclination at which these hostile elements may be descending.

It will be obvious from the construction which has been illustrated and described that the cover means will not be required to extend down and along flaps which open in the top portion 14 of the glazing structure and that, therefore, there will be no damage caused the roll down cover, nor will the roll down cover interfere in any way with the operation of the venting system of the invention.

Figure 5:
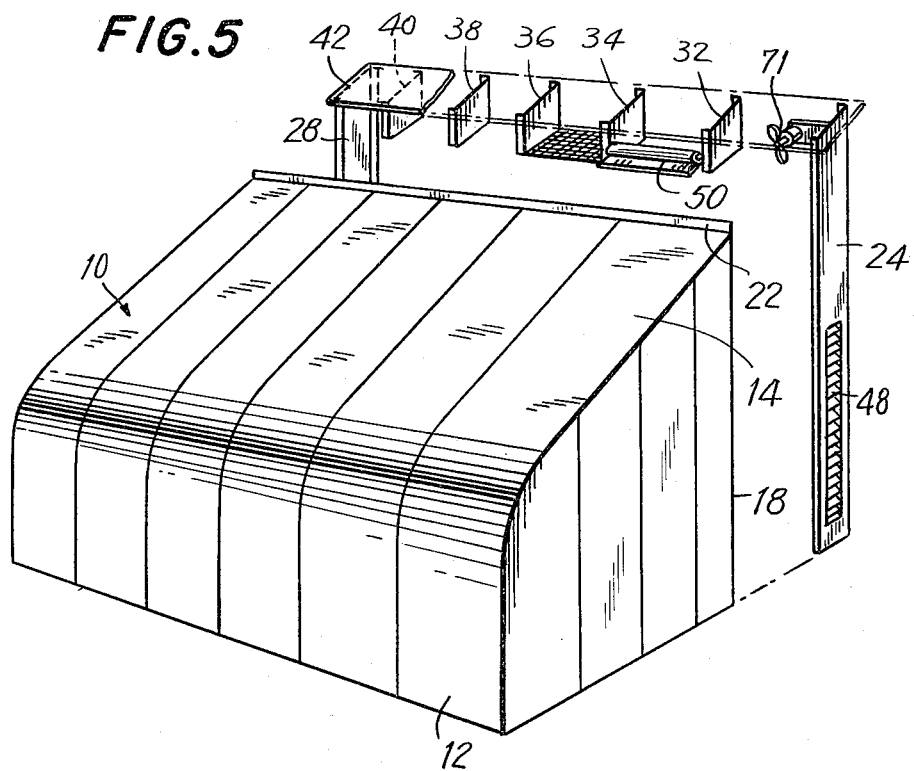

A further explanatory view of the above-described embodiment of the invention appears in FIG. 5 wherein is again seen the glazing structure 10 including front portion 12 and end portions 16 at opposite ends of the front portion 12 and the top portion 14. Also illustrated in FIG. 5 are the end edge portions 18 and top edge portion 22.

This view gives a more comprehensive understanding of the function of channels 24 and 28 in forming substantially a collar which obturates the openings or spaces between the end edge portions 18 and the supporting structure 20 referred to hereinabove. Also illustrated in this figure is the shed 42 supported on the upper sloped edges of the various channels.

Figure 6:
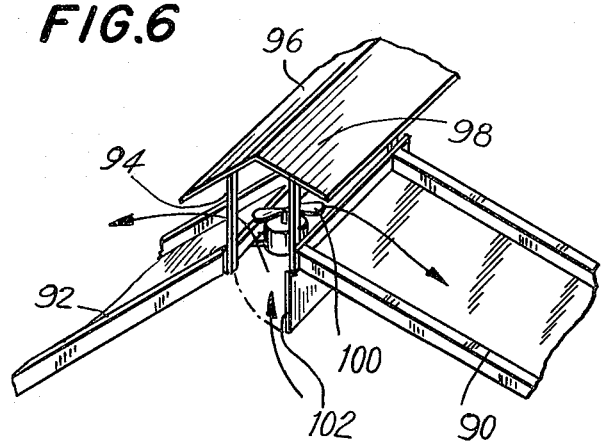

FIG. 6 illustrates a second embodiment of the invention wherein an opening is provided between a glazing structure 90 of the afore-described type and the mirror image thereof as indicated at 92. Therein are provided channel braces such as indicated at 94 with a double mitre or slope supporting a shed having two sloped sides 96 and 98 performing the function indicated hereinabove. In this embodiment of the invention is also employed a fan 100, as well as a flap 102, to provide for the selective obturating of the opening defined between the two glazing structures both of which constitute supporting structures for one another.

It will now be obvious that the invention provides for the effective mounting of conventional glazing structures, since the glazing structures which have been referred to hereinabove may be of any conventional design.

The method of the invention involves mounting a glazing structure against a supporting structure and venting the resulting enclosure, the glazing structure including conventionally vertical end edges and a horizontal top edge.

The method of the invention includes, specifically, spacing said glazing structure from said supporting structure to form spaces between said edges and said supporting structure, obturating, at least substantially, the spaces between the end edges and the supporting structure to leave open the space between the top edge and supporting structure, and selectively exhausting air from said enclosure via the latter said space.

According to features of the method of the invention a shed is mounted on the supporting structure above the latter said space and in overlapping relationship with the glazing structure at the top edge. The opening is selectively obturated and the glazing structure is selectively covered or not, depending on climatic conditions.

There will now be obvious to those skilled in the art many modifications and variations of these structures and methods set forth hereinabove. These modifications and variations will not depart from the scope of the invention if defined by the following claims.

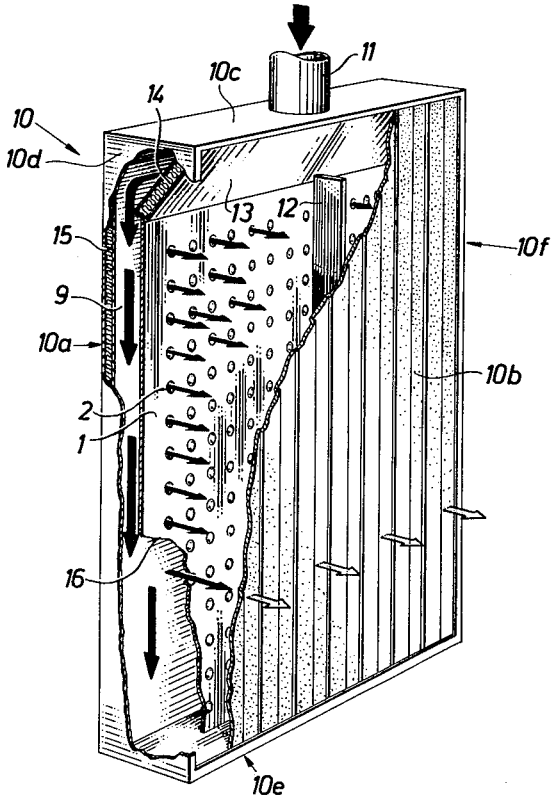

What is claimed is:

1. A greenhouse or solarium construction comprising glazing means defining a space adapted for accommodating botanical or animal life, said glazing means having an open side, structure means adapted at least partly to obturate said open side, spacing collar means between said glazing means and structure means for substantially obturating said open side except for an opening defined at an upper region of the glazing means between the glazing means and the structure means, and exhaust means to displace air from said space via the opening between the glazing means and said structure means, the spacing collar means including a plurality of horizontally aligned vertical channels coupled to and extending between said structure means and glazing means, the channels being spaced and parallel C-channels, the glazing means including a horizontal top edge portion and vertical end edge portions, and first and second of said channels extending along the end edge portions between the latter and said structure means, and other of said channels, which are substantially shorter than said first and second channels, extending between and spacing the top edge portion and said structure means, and insulation means in the first and second channels, at least some of the channels extending upwardly relative to said top edge portion and including sloped upper end portions sloping downwardly away from said structure means, said greenhouse or solarium construction further including shed means supported on said sloped upper end portions and extending in partially overlapping relation with said glazing means, at least one of said channels including means defining at least one screw hole and including a screw in said screw hole, having an axis parallel to the associated channel providing for attachment of said shed means.

2. A greenhouse or solarium construction as claimed in claim 1 wherein said structure means is a vertical wall of a building.

3. A greenhouse or solarium construction as claimed in claim 1 wherein said structure means is a second glazing means.

4. A greenhouse or solarium construction as claimed in claim 3 wherein the two said glazing means have shapes which are generally mirror reflections of each other.

5. A greenhouse or solarium construction as claimed in claim 1 comprising a shed means spaced above said opening in partially overlapping relation with said glazing means to define a generally lateral continuation of said opening and to protect the opening from rain.

6. A greenhouse or solarium construction as claimed in claim 1 wherein at least one of the first and second channels is provided with air intake vents.

7. A greenhouse or solarium construction as claimed in claim 1 comprising roll down cover means supported above said glazing means to provide for covering the same.

8. A greenhouse or solarium construction as claimed in claim 1 comprising roll down cover means supported above said glazing means adjacent said horizontal top edge portion to provide for selective covering of the glazing means.

9. A greenhouse or solarium construction as claimed in claim 1 comprising means for selectively closing said opening.

10. A greenhouse or solarium construction as claimed in claim 9 wherein the latter said means includes a pivotable flap.

11. A greenhouse or solarium construction as claimed in claim 1 comprising means on said structure means for selectively closing said opening.

12. A greenhouse or solarium construction as claimed in claim 1 comprising vent means in said glazing means.

13. A greenhouse or solarium construction as claimed in claim 1 wherein the exhaust means includes at least one fan positioned adjacent said opening.

14. A greenhouse or solarium construction as claimed in claim 5 wherein said shed means is countersunk into said structure means.

15. A greenhouse or solarium construction as claimed in claim 1 comprising fastening means coupling said channels to said structure means.

* * * * *

United States Patent [19]

Lind

[11] 4,316,406
[45] Feb. 23, 1982

[54] FLOW-DISTRIBUTING DEVICE AND AN AIR-INTAKE SCREEN PROVIDED WITH SUCH A DEVICE

[76] Inventor: Leif I. Lind, Storsjövägen 7, 121 71 Johanneshov, Sweden

[21] Appl. No.: 83,979

[22] Filed: Oct. 11, 1979

[30] Foreign Application Priority Data

Oct. 13, 1978 [SE] Sweden ................. 7810734

[51] Int. Cl.³ .............................................. F24F 13/06
[52] U.S. Cl. .................................. 98/40 R; 98/40 D; 98/40 N; 98/115 LH
[58] Field of Search ................. 98/29, 31, 40 R, 40 C, 98/40 D, 40 DL, 40 V, 40 VM, 40 N, 36, 115 LH

[56] References Cited

U.S. PATENT DOCUMENTS

| 3,012,493 | 12/1961 | Ekeren | 98/40 D |
|---|---|---|---|
| 3,726,204 | 4/1973 | Lindeström | 98/40 N X |
| 4,170,930 | 10/1979 | Lind | 98/40 D |

FOREIGN PATENT DOCUMENTS

| 70973 | 4/1950 | Denmark . | |
|---|---|---|---|
| 1102371 | 3/1961 | Fed. Rep. of Germany | 98/40 N |
| 584872 | 2/1977 | Switzerland . | |
| 1206349 | 9/1970 | United Kingdom | 98/40 D |

*Primary Examiner*—Albert J. Makay
*Assistant Examiner*—Harold Joyce

*Attorney, Agent, or Firm*—Fleit & Jacobson

[57] ABSTRACT

A flow-distributing device comprises a perforated plate (1) which forms a defining wall of a passage or chamber arranged to accommodate a flow of fluid and provided with at least one further defining wall. Deflecting means (1a; 3) extend into the path of said flow adjacent the perforations (2) which are evenly distributed over at least a part of said wall. The deflecting means divide the flow into a plurality of part-flows which pass in mutually the same direction to the other side of the plate via the perforations. The deflecting means may comprise separate nozzles (3) or lips (1a) which have been pressed out of the material when forming the holes. The flow-distributing device may be incorporated in an air-supply device for a furnace, a fluidized bed, an air cooler or heater or the like. In one important application it is used in a substantially box-shaped air-intake screen (10) having a perforated side surface (10b) and an air-supply pipe (11). In this case, the flow-distributing device forms an intermediate wall in the screen, said wall being located at a distance from the perforated side surface to define a pressure chamber (9) on the opposite side of the intermediate wall. In order to dampen any sound which may be generated, the distributing device may be joined to the interior of the screen by means of oblique surface (13) opposite the air-supply pipe. The oblique surface may have a covering of sound-insulating material (14).

9 Claims, 7 Drawing Figures